United States Patent [19]

Nanae et al.

[11] Patent Number: 4,760,315

[45] Date of Patent: Jul. 26, 1988

[54] BRUSHLESS MOTOR DRIVE CIRCUIT

[75] Inventors: Yuuichi Nanae, Kanagawa; Hideo Niikura, Tokyo, both of Japan

[73] Assignee: Sony Corporation, Tokyo, Japan

[21] Appl. No.: 906,502

[22] Filed: Sep. 12, 1986

[30] Foreign Application Priority Data

Sep. 20, 1985 [JP] Japan .................................. 60-208148

[51] Int. Cl.⁴ ............................................... H02P 6/02
[52] U.S. Cl. .................................................... 318/254
[58] Field of Search ........................ 318/138, 254, 439

[56] References Cited

U.S. PATENT DOCUMENTS

| 4,230,976 | 10/1980 | Muller | 318/138 |
| 4,356,437 | 10/1982 | Saito et al. | 11/254 |
| 4,442,386 | 4/1984 | Uchida et al. | 318/254 |

FOREIGN PATENT DOCUMENTS

| 56-19393 | 2/1981 | Japan | 318/254 |
| 56-19394 | 2/1981 | Japan | 318/254 |
| 56-19395 | 2/1981 | Japan | 318/254 |
| 56-41787 | 4/1981 | Japan | 318/254 |

Primary Examiner—Bentsu Ro
Attorney, Agent, or Firm—Ronald P. Kananen

[57] ABSTRACT

A brushless motor drive circuit includes a plurality of Hall elements for detecting magnetic flux changes of a rotating rotor magnet. A drive signal generating circuit generates drive signals applied to the stator windings of the motor. Each of the drive signals has a pair of slanted edge portions and a relatively flat portion interposed between the slanted edge portions which are directly formed from said detected flux changes. The circuit is effective in preventing acoustic noises during phase switching.

14 Claims, 8 Drawing Sheets

BRUSHLESS MOTOR DRIVE CIRCUIT

BACKGROUND OF THE INVENTION

This invention relates to a drive circuit for a brushless (BL) motor. More particularly, this invention relates to a drive circuit for a BL motor utilizing Hall elements to reduce acoustic noises during phase switching. Still more particularly, this invention relates to a drive circuit for a conventional BL motor employing Hall elements for producing output energization signals having a predetermined desirable waveform for application to stator coils on the BL motor.

A number of switching drive systems for energizing conventional BL motors are known. Such a switching drive system sometimes utilizes switching transistors for switching the energization or phase for such a conventional BL motor. When using such a switching drive system, a resulting high-frequency mechanical vibration of stators and rotors of the BL motor generates relatively loud acoustic noises which are caused by abrupt current changes at the time of phase switching. The acoustic noises are most noticeable when caused by the changes occurring at the rising edges of the applied motor current. Conventionally, condensers have been used to prevent the generation of the acoustic noises. The condensers, such as electrolytic condensers, having a comparatively large capacity, are connected in parallel with the stator coils to slow current changes during phase switching.

The conventional method using such condensers has disadvantages. For example, the method is not effective when the rotation number of the motor is small. Furthermore, use of condensers degrades motor efficiency because of the phase delay of an energization current which occurs which in turn causes an invalid current to flow when the rotation number of the motor is large.

A linear drive system for a BL motor is also known which utilizes a sinusoidal energization current. While such a circuit is effective in reducing acoustic noise, the motor drive efficiency is remarkably lowered by such a linear drive system compared with a switching drive system.

Accordingly, it has remained a problem in the art to reduce a motor drive circuit for a BL motor which maintains motor efficiency comparable with that of a switching drive system, while reducing acoustic noises during phase switching.

Thus, it is an overall object of the invention, therefore, to provide a BL motor drive circuit having a motor efficiency which is comparable to the efficiency of a switching drive system, while reducing acoustic noises during phase switching.

It is another general object of this invention to provide a BL motor drive circuit to achieve those results by replacement of the drive circuit, without altering the mechanical structure of an conventional BL motor.

It is an additional object of this invention to provide a BL motor drive circuit using output signals of Hall elements for position detection to produce waveforms having predetermined characteristics to prevent acoustic noises during switching while preserving the efficiency of the switching drive system.

These and other objects and features of the present invention will become apparent from the foregoing detailed description of the invention and the appended claims, with reference to the accompanying drawings.

BRIEF SUMMARY OF THE INVENTION

Directed to overcoming the problems noted above with respect to the prior art and achieving the above-stated objects, the invention relates to a BL motor with a three-phase bi-directional, 120° energization system, by way of example. According to the invention, output signals from a plurality of Hall elements are provided for detecting the position of the rotor and providing an energization signal through accompanying circuitry having edge portions similar to inclined waveforms of the edge portion of the output signals. The energization signals are supplied to stator coils of the BL motor, whereby acoustic noise generation during switching is prevented with the same efficiency as the switching drive system.

The waveforms of the Hall elements depend upon magnetic flux changes from rotor magnets in the BL motor. Thus, the waveforms of the output signals of the Hall elements are almost trapezoidal, depending on the distances between the rotor magnets and the Hall elements, the positions or sizes of the non-magnetic regions of the rotor magnets, and other factors. According to the invention, the edge portions of the energization signals are formed by shifting the level or amplifying the edge portions at the output signals of the Hall elements to provide the desired waveform. Accordingly, the edge portions of the energization signals do not become abrupt and thus prevent the generation of acoustic noises. Because the output waveforms are utilized according to the invention, no phase change occurs even if the rotation number of the BL motor varies. Moreover, since a trapezoidal drive signal is thus employed, motor efficiency is not lowered.

According to one aspect of the invention, a BL motor drive circuit according to the invention comprises a plurality of Hall elements for detecting magnetic flux changes in a rotating rotor magnet. A drive signal generating circuit is connected to the Hall elements for generating multi-phase drive signals which are supplied to the stator windings of a multi-phase BL motor. Each of the multi-phase drive signals has a pair of slanted edge portions and a relatively flat portion interposed between the pair of slanted edge portions which are directly formed from the detected flux changes. Thus, the drive signal is generally trapezoidal in shape. Preferably, the drive signal generating circuit includes a signal clamping circuit to form the flat portion of the generally trapezoidal multi-phase drive signal, while a portion of the slanted edge portions of adjacent pairs of the multi-phase drive signals form an overlapping drive area. The slanted edge portion of the multi-phase drive signal subtends an electrical angle which lies within the range of 2° el. to 30° el.

In a typical operative embodiment, the drive signal generating circuit includes a plurality of buffer amplifying circuits connected to the Hall elements; clamping circuits; non-adder mixing circuits; analog switching circuits; and output amplifiers respectively connected in series, a plurality of such series circuits being respectively connected in parallel with the plurality of Hall elements. Each drive signal generating circuit further includes swithcing pulse generating circuits for generating switching pulses supplied to the analog switching circuts based upon detected magnetic flux changes. In an alternative embodiment, non-adder mixing circuits are replaced by signal mixing circuits in the series arrangements. These and other features of the invention will become apparent from a review of the written description of the invention which follows, taken in conjunction with the accompanying drawings.

BRIEF DESCRIPTION OF THE DRAWINGS

In the drawings:

FIG. 6, including FIGS. 6A–6H, is a waveform diagram for use in describing the development of the energization waveforms in the circuit of FIG. 3;

FIG. 9, including FIGS. 9A–9E, is a waveform diagram useful in describing the development of an energization waveform in an alternative embodiment of the invention; and FIG. 10, including FIGS. 10A–10G, is another waveform diagram for describing the development of the energization waveform in still another embodiment fo the invention.

DETAILED DESCRIPTION OF THE PREFERRED EMBODIMENTS

A description of the embodiments of the inventon is provided according to the following general sequence. First, the shaping of the waveform of the output signals of the Hall elements is described in connection with FIGS. 1 and 2. Next, the circuit of FIG. 3 for developing the energization waveform is described, followed by a description of the circuit for generation of the switching pulses, referring to FIG. 4. Thereafter, the operation for developing the energization waveform is described in connection with FIGS. 5 and 6, followed by a description of an alternative embodiment in connection with FIGS. 7 and 8. The waveform shaping of the output signals of the Hall elements is further described in connection with FIGS. 9 and 10.

a. Waveform shaping of the output signals of the Hall elements.

Figure 1:
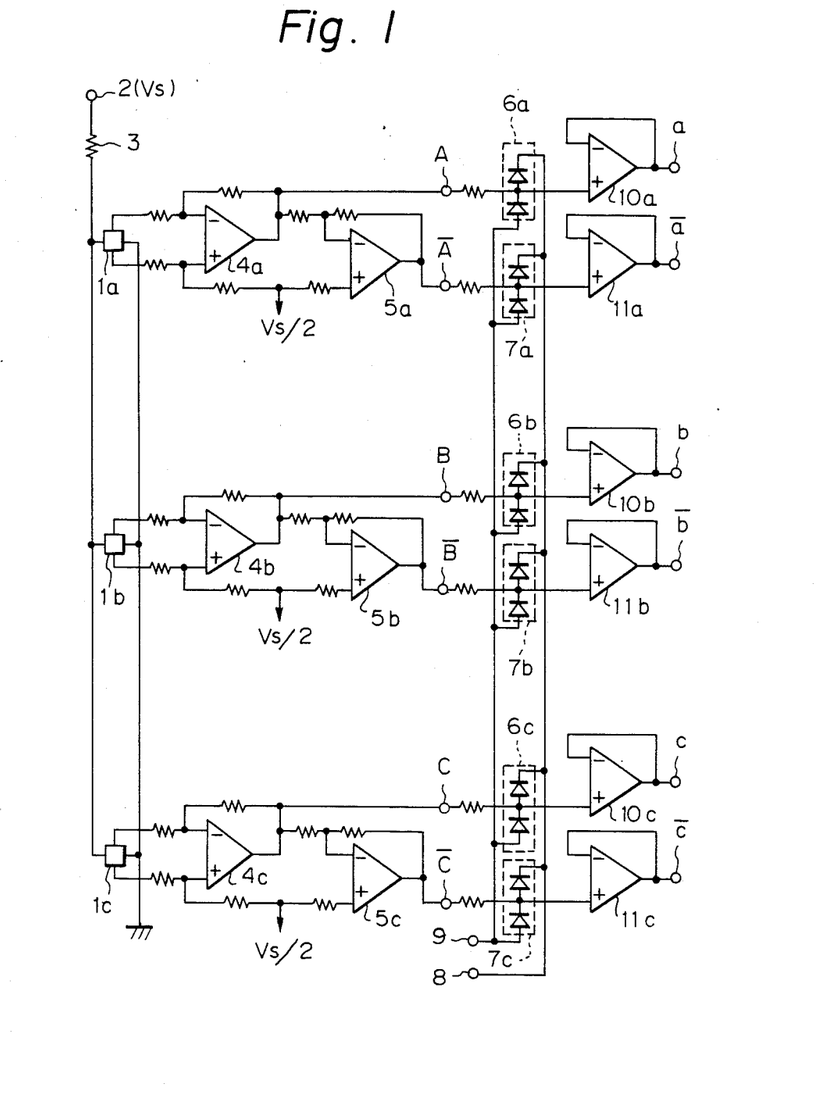
FIG. 1 is a circuit diagram of a waveform-shaping circuit for shaping the output signals of the Hall elements, according to one embodiment of the invention.

FIG. 1 shows a circuit for shaping the waveform of the output signals from the Hall elements utilized in the invention. A plurality of Hall elements $1a$, $1b$, and $1c$ are provided for generating output voltages proportional to the magnetic fluxes from the rotor magnets of the BL motor. Each of the Hall elements $1a$, $1b$, and $1c$ is driven by a drive voltage obtained from an external source of power Vs provided to a power source terminal 2 through a resistor 3 connected in common with an input of each of the Hall elements. In the embodiment of FIG. 1, the voltage Vs is maintained at a level equal to that provided to the stator coils of the BL motor.

An output from each of the Hall elements $1a$, $1b$, and $1c$ is respectively amplified by pairs of operational amplifiers $4a$, $5a$; $4b$, $5b$; and $4c$, $5c$. In the amplifiers $4a$, $4b$, and $4c$, differential signals are converted into single-ended signals for inversion by the inverting amplifiers $5a$, $5b$, and $5c$. Thus, a detection signal A is obtained from the output of the amplifier $4a$, while a complementary detection signal $\overline{A}$ is provided at the output of the amplifier $5a$. The detection signals A and $\overline{A}$ are opposite in phase.

Similarly, detection signals B and C are provided at the outputs from the amplifiers $4b$ and $4c$, respectively, while complementary detection signals $\overline{B}$ and $\overline{C}$, opposite in phase to the detection signals B and C respectively, are provided at the outputs of the amplifiers $5b$ and $5c$.

Figure 2A:
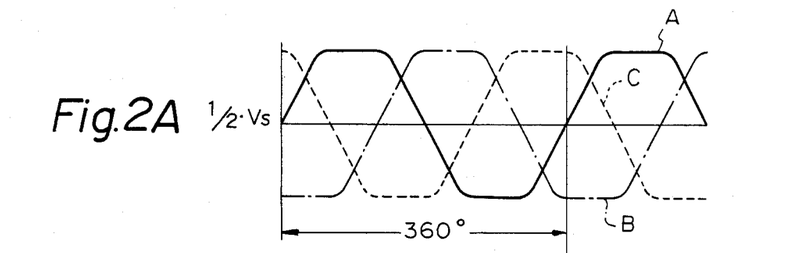
FIGS. 2A and 2B are diagrams of waveforms at selected points in the circuit of FIG. 1 for showing the output waveforms from the respective Hall elements.

FIG. 2A shows the phase relationship among the respective detection signals A, B, and C provided at the outputs of the amplifiers $4a$, $4b$, and $4c$, as shown in FIG. 1. In FIG. 2A, the waveform shown in the solid line represents the detection signal A, while the waveform shown by the dotted/dashed line represents the detection signal B. The waveform indicated by the broken line represents the detection signal C. The detection signals A, B, and C produced by the circuit of FIG. 1 are each generally trapezoidal in shape having a flat center portion and are superimposed about an operating level of Vs/2. The respective detection signals A, B, and C differ in phase from each other by 120° electrically. The leading and trailing edges of each of the detection waveforms A, B, and C are inclined to provide a waveform which corresponds to the sizes of the non-magnetic regions of the rotor magnets, the gaps between the rotor magnets and the Hall elements, and other factors.

As shown in FIG. 1, the detection signal A is provided to a diode clamping circuit $6a$, while its complementary signal $\overline{A}$ is provided to a diode clamping circuit $7a$. Similarly, the detection signals B, $\overline{B}$, C, and $\overline{C}$ are respectively provided to diode clamping circuits $6b$, $7b$, $6c$, and $7c$. The diode clamping circuits $6a$, $6b$, and $6c$ act to normalize the maximum level of the detection signals A, B, and C to a clamping voltage provided from a terminal 8 from an external clamping voltage source to each of the diode clamping circuits $6a$, $6b$, and $6c$. The magnitude of the clamping voltage applied to the terminal 8 is given by the expression $3Vs/4-1 - Vf$, where Vf indicates a forward voltage drop of the diode. The magnitude of the voltage applied to the terminal 9 is given by the expression $Vs/4 + Vf$. The terminal 9 is in circuit with each of the diode clamping circuits $7a$, $7b$, and $7c$.

The output signal from the diode clamping circuit $6a$ is provided to an input of an operational amplifier $10a$ acting as a buffer amplifier to provide an output signal a. Similarly, the output signals from the diode clamping circuits $7a$, $6b$, $7b$, $6c$, and $7c$ are respectively provided to an input of the operational amplifiers $11a$, $10b$, $11b$, $10c$, and $11c$, each of which acts as a buffer amplifier similar to the buffer amplifier $10a$. The output signals from the buffer amplifiers $10a$, $11a$, $10b$, $11b$, $10c$, and $11c$, are respectively denoted by the letters a, $\overline{a}$, b, $\overline{b}$, c, and $\overline{c}$, where, for example, the signal a is oppostie in phase to the signal $\overline{a}$. The signals a, b, and c are shown in FIG. 2B.

Figure 2B:
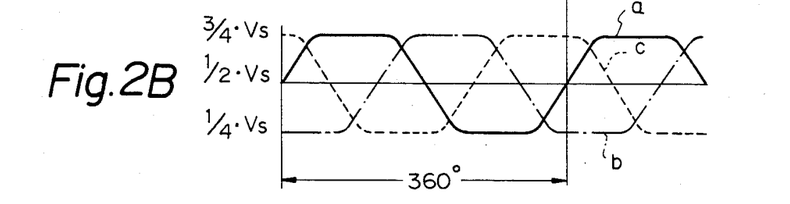

The output signals of FIG. 1, therefore, are generally trapezoidal detection signals having a maximum value of $(\frac{3}{4}) \cdot Vs$, a minimum value of $(\frac{1}{4}) \cdot Vs$, and a center level of Vs/2, and the signal a is shown by the solid line in FIG. 2B. The outputs of the operational amplifiers $10b$ and $10c$, denoted by the letters b and c are also generally trapezoidal in form, as seen in FIG. 2B, having maximum, minimum, and central levels similar to the signal a. Similarly, the complementary signals $\bar{a}$, $\bar{b}$, and $\bar{c}$, which are opposite in phase to the detection signals a, b, and c, are respectivley output from the operational amplifiers 11a, 11b, and 11c, although not specifically shown in FIG. 2B.

The above described detection signals, a, b, c, and $\bar{a}$, $\bar{b}$, and $\bar{c}$, are used to develop the energization waveforms for the stator coils on the BL motor as will be better understood from a discussion of FIGS. 3 and 6 later in this specification. The detection signals A, $\bar{A}$, B, $\bar{B}$, C, and $\bar{C}$ form switching pulses, as discussed in connection with FIGS. 4 and 5.

b. Energization-waveform-developing circuit

Figure 3:
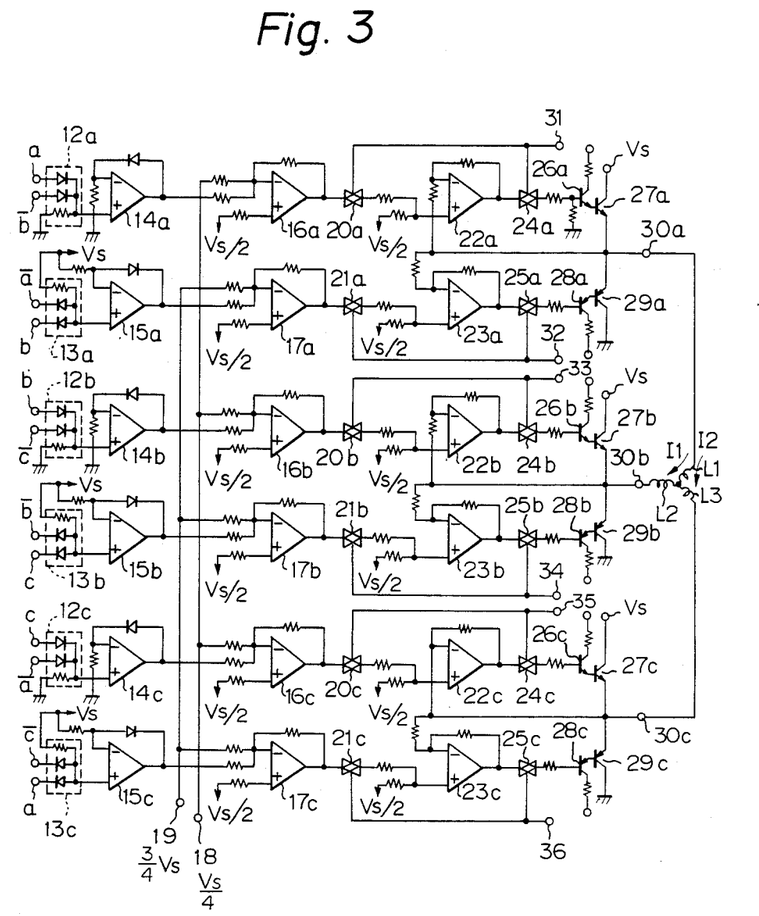
FIG. 3 is a circuit diagram of a circuit according to the invention for developing the energization signals from the output of FIG. 1.

FIG. 3 shows a circuit for generating an energization-waveform for the embodiment of FIG. 1. The detection signals $\bar{a}$, $\bar{b}$, and $\bar{c}$ and their complementary detections signals a, b, and c, as provided from FIG. 1 provide the inputs to the circuit of FIG. 3. The outut signals from the circuit of FIG. 3 are respectively provided to stator coils L1, L2, and L3 respectively. In the embodiment shown in FIG. 3, a three-phase bi-directional energization circuit is shown in a structure in which an end of each of the respective stator coils L1, L2, and L3 is commonly connected, while the other end of each of the stator coils is connected respectively to an output terminal 30a, 30b, and 30c of the circuit. Thus, the circuit structure of the energization-waveform for the stator coil L1 will be described in detail, with the understanding that a similar circuit description of the circuit structure for the energization-waveform for the stator coils L2 and L3 is substantially identical and operates in the same manner.

The detection signal a from the Hall element 1a and the detection signal $\bar{b}$, which is an inversion of the detection signal b from the Hall element 1b, are respectively provided to a non-adding mixing circuit 12a comprising a pair of diodes and a resistor, connected as shown. A signal having a magnitude which is the larger of the signals a and $\bar{b}$ is thus produced from the non-adding mixing circuit 12a. The output signal of the non-adding mixing circuit 12a is provided to an input of an operational amplifier 14a which acts to buffer and cancel the diode forward voltage drop (Vf).

The detection signal $\bar{a}$, which is the inversion of the detection signal a, and the detection signal b are respectively applied to an input of an non-adding mixing circuit 13a, composed of diodes and a resistor as shown and similar to the mixing circuit 12a. A signal having a magnitude which is the lesser of the detection signals $\bar{a}$ and b is output from the non-adding mixing circuit 13a. The output signal from the non-adding mixing circuit 13a is provided to an operational amplifier 15a similar to the amplifier 14a, for buffering and cancelling the diode forward voltage drop.

The output signals from the opertional amplifiers 14a and 15a are respectively provided to an inverting input of the operational amplifiers 16a and 17a. The operational amplifiers 16a and 17a act as inversion amplifiers to shift the DC operating level. The inverting terminal of the operational amplifier 16a is connected through a resistance to a terminal 18 to which is provided a direct current voltage having a magnitude of Vs/4 which is added to the input signal of the operational amplifier 16a. Similarly, a direct current voltage of ($\frac{3}{4}$) Vs provided at a terminal 19 is added to the input signal of the operational amplifier 17a. The non-inverting terminal of each of the operational amplifiers 16a and 17a is connected to a voltage having a magnitude of Vs/2.

The output terminals of the operational amplifiers 16a and 17a are respectively connected to analog switches 20a and 21a. The analog switches are respectively controlled by switching signals on the terminals 31 and 32, provided by the circuit of FIG. 4.

The output signal of the analog switch 20a is provided to the analog switch 24a through an operational amplifier 22a acting as a buffer amplifier. The output signal of the analog switch 24a is provided to the base of an npn type transistor 26a which acts as an output stage for the circuit. In a similar manner, the output signal of the analog switch 21a is provided to the base of a pnp type transistor 28a at the output stage through an operational amplifier 23a and an analog switch 25a. Each of the analog switches 20a and 24a turns on when a switching pulse from a terminal 31 achieves a high level. Similarly, each of the analog switches 21a and 25a turns on when a switching pulse at a terminal 32 assumes a high level. Thus, the analog switches are respectively controlled in pairs by signals appearing at the terminals 31 and 32.

The emitter of the transistor 26a is coupled to the base of an npn type transistor 27a, while the emitter of the transistor 28a is connected to a base of an pnp type transistor 29a. The collector of the transistor 27a is connected to a power source terminal to which is provided a power source voltage Vs, while the collector of the transistor 29a is connected to a source of reference potential, such as ground. The emitters of the transistors 27a and 29a are mutually coupled to an output terminal 30a. A feedback loop is provided from the output terminal to the inputs of the operational amplifiers 22a and 23a. Thus, an output voltage, which does not contain the base-emitter voltage drops of the transistors and is equal to the input voltage of the operational amplifiers 22a and 23a, is produced at the output terminal 30a.

Circuit structures similar to that described above for developing an output voltage generated at the output terminal 30a are also provided in connection with the output terminals 30b and 30c, respectively. Specifically, a similar circuit is provided having as its input the detection signals b, $\bar{c}$, and $\bar{b}$, c, in circuit with output terminal 30b, and another circuit having inputs c, $\bar{a}$, and $\bar{c}$, a, provides an output at terminal 30c. Thus, an output voltage taken from the output terminal 30b is formed from the detection signals b, $\bar{c}$, $\bar{b}$, and c, at the output of the circuit of FIG. 1, while an output voltage derived from the output terminal 30c is formed from signals c, $\bar{a}$, $\bar{c}$, and a. Thus, the components shown in the remaining circuit of FIG. 3 are similar in function and operation to those described with respect to the same reference numerals above, but are appended with the letters b and c. It should be noted that a terminal 33 is provided as an input terminal for a switching pulse for controlling the analog switches 20b and 24b, while an input terminal 34 receives a switching pulse for controlling the analog switches 21b and 25b. Similarly, a switching pulse is provided to a terminal 35 for controlling the analog switches 20c and 24c, while a switching pulse is provided at a terminal 36 for controlling the analog switches 21c and 25c.

c. Generation of switching pulses.

Figure 4:
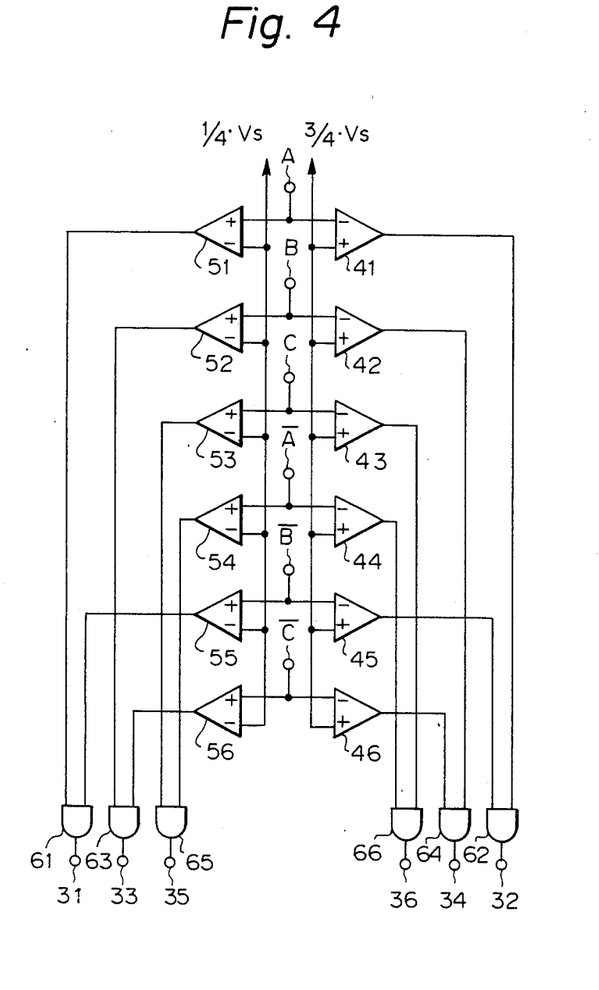
FIG. 4 is a circuit diagram of a switching pulse generator for providing switching signals utilized in the circuit of FIG. 3.

FIG. 4 shows a circuit for generating switching pulses applied to the terminals 31–36 of FIG. 3. As shown in FIG. 4, a plurality of level comparators 41–46 have their non-inverting terminals commonly connected and have their inverting terminals respectively connected to the non-inverting terminals of a like plurality of level comparators 51–56. The comparators 51–56 have their inverting terminals commonly connected. A reference voltage having a magnitude of ($\frac{2}{3}$)Vs is supplied to one of the input terminals of each of the level comparators 41–46. The level comparators 41–46 produce high level outputs when the level of each input voltage given to the other input terminal is lower than ($\frac{2}{3}$)Vs and, in the opposite case, produce low level outputs. A reference voltage having a magnitude of ($\frac{1}{3}$)Vs is applied to the other input terminal of each of the level comparators 51–56, which generate high level outputs when the level of each input voltage provided at one input terminal is higher and ($\frac{1}{3}$)Vs and, in the opposite case, generate low level outputs.

The detection signals A, B, and C from the Hall elements 1a, 1b, and 1c are supplied from the circuit of FIG. 1 to the other input terminal of each of the level comparators 41, 42, and 43 and one input terminal of each of the level comparators 51, 52, and 53. Similarly, the inverted detection signals $\overline{A}$, $\overline{B}$, and $\overline{C}$ are provided to the other input terminal of each of the level comparators 44, 45, and 46, and to one input terminal of each of the level comparators 54, 55, and 56. The outputs from the level comparator 51 and the level comparator 55 are provided to an AND gate 61, while the outputs from the comparators 52 and 56 are provided to an AND gate 63. The outputs from the comparators 53 and 54 and provided to an AND gate 65. Similarly, the outputs from the level comparators 41 and 45 are connected to an AND gate 62; the outputs from the level comparators 42 and 46 are provided to an AND gate 64; and the outputs from the comparators 43 and 44 are provided to an AND gate 66. The AND gates 61, 63, and 65 respectively provide outputs at terminals 31, 33 and 35 which correspond to the switching pulse terminals in FIG. 3. Similarly, the AND gates 62, 64, and 66 provide output pulses at terminals 32, 34, and 36 which respectively provide switching pulses to the corresponding input terminals shown in FIG. 3. The operation of the circuit of FIG. 4 for generating switching pulses to the terminals 31 and 32 will be described, by way of example, by reference to FIG. 5.

Figure 5:
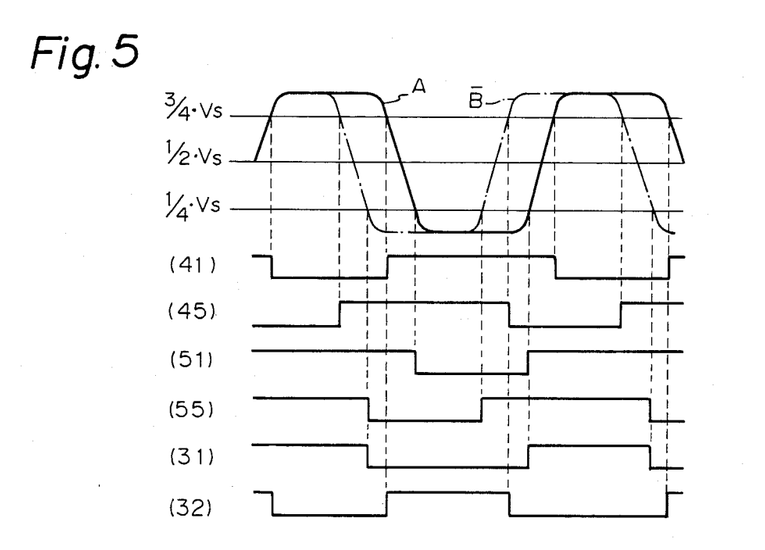
FIG. 5 is a waveform diagram for describing the operation of the switching pulse generating circuit of FIG. 4.

As shown in FIG. 5, on the basis of the voltage level-relationship of the signal A, shown by a solid line, and the signal $\overline{B}$, shown by a broken line, with the reference voltages as previously indicated of ($\frac{1}{3}$)Vs and ($\frac{2}{3}$)Vs, the output of the level comparator 41 assumes a high level when A is less than ($\frac{2}{3}$)Vs. The output of the level comparator 45 assumes a high level when $\overline{B}$ is less than ($\frac{2}{3}$)Vs. The outut of the level comparator 51 assumes a high level when the magnitude of the detection signal A is greater than ($\frac{1}{3}$)Vs, while the output of the level comparator 55 assumes a high level when $\overline{B}$ is greater than ($\frac{1}{3}$)Vs. Consequently, the switching pulse produced by the AND gate 61 at the terminal 31 and the switching pulse formed by the AND gate 62 at the terminal 32 are those shown by corresponding reference numerals in FIG. 5. Thus, the analog switches 20a, 24a and the analog switches 21a, 25a turn on during periods in which these switching pulses have high levels, as previously described.

A similar analysis applies to the relative signal levels applied to the inputs of the AND gates 62 and 63 for generating switching pulses at the terminals 33, 34, 35, and 36.

d. Development of energization-waveforms.

Figure 6A:
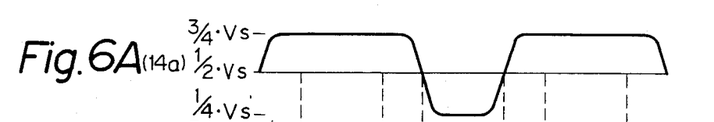
Figures 6B, 6C:
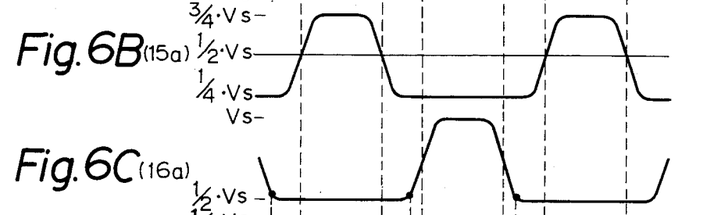
Figure 6D:
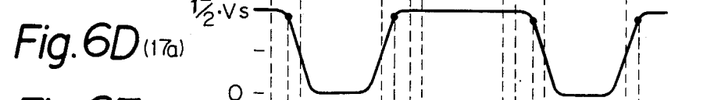

FIG. 6, including FIGS. 6A–H, provides a diagram useful is considering the development of an output voltage or an energization waveform generated at the output terminal 30a at FIG. 3, using the switching circuit of FIG. 4, by way of example. When the signals a and $\overline{b}$ are provided to the non-adding mixing circuit 12a, a signal having a magnitude which is the larger of the magnitude of both signals, as shown in FIG. 6A, is produced at the output of the operational amplifier 14a. Similarly, when the signals $\overline{a}$ and b are provided to the non-adding mixing circuit 13a, a signal having a magnitude which is the smaller of the level of both signals, as shown in FIG. 6B, is produced at the output of the operational amplifier 15a. The output signal of the operational amplifier 14a, as shown in FIG. 6A, is the signal having a center level of ($\frac{1}{2}$)Vs, a maximum value of ($\frac{2}{3}$)Vs, and a minimum value of ($\frac{1}{3}$)Vs, as previously described. The output signal of the operational amplifier 15a, as shown in FIG. 6B, is a signal having a similar series of levels. As shown in FIG. 6C, a signal having a level of [($\frac{1}{3}$)Vs~Vs] is generated at the output of the amplifier 16a, as a result of the rising shift of the ($\frac{1}{3}$)Vs level shown in FIG. 6A and its subsequent inversion. As indicated in FIG. 6D, a signal having a level [0~($\frac{1}{3}$)Vs] is produced at the output of the operational amplifier 17a as a result of a decreasing shift of the ($\frac{1}{3}$)Vs level of the signal shown in FIG. 6B and its inversion.

Figures 6E, 6F:
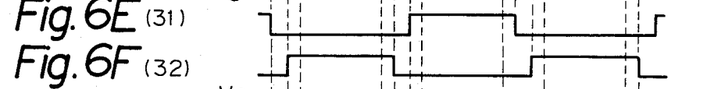
Figure 6G:
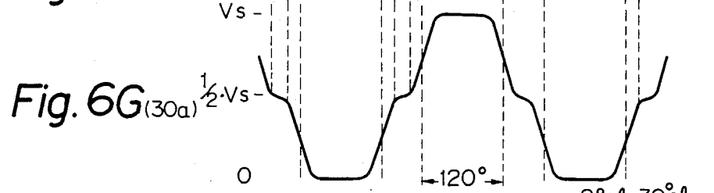

An almost high level period in the signal shown in FIG. 6C is provided in the outputs of the analog switches 20a and 24a by a switching pulse from the terminal 31, as shown in FIG. 6E. By a switching pulse from the terminal 32, as shown in FIG. 6F, an almost low level period in the signal shown in 6D is provided at the outputs of the analog switches 21a and 25a. Therefore, an output voltage obtained by the combination of the two signal waveforms gated by the analog switches 21a and 25a is produced at the output terminal 30a, as shown in FIG. 6G.

Figure 6H:
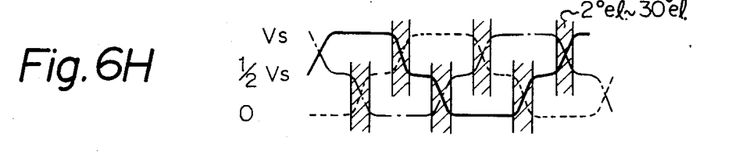

Output voltages formed in a manner similar to the formation of the output voltage described above at terminal 30a, are derived at the output terminals 30b and 30c, respectively, using appropriately gated voltage signals form the circuit of FIG. 4. As thus shown in FIG. 6H, a waveform indicated by a solid line shows an output voltage generated at the output terminal 30a; a waveform indicated by a broken line shows the output voltage generated at the output terminal 30b; and the waveform indicated by a dotted/dash line shows an output voltage appearing at the output terminal 30c. As can be seen in FIG. 6H, the energization is sequentially accomplished for each of the stator coils L1, L2, and L3 for a slightly larger energizing range than 120°.

Referring again to FIG. 3, and assuming that a current flowing through the stator coils L1 and L2 is I1, and a current flowing through the stator coils L1 and L3 is I2, (where I1>I2), is established in the interval in which the output terminal 30a has a voltage signal having a magnitude Vs, the output terminal 30b thus has a magnitude ($\frac{1}{2}$)Vs, and the output terminal 30c has a zero voltage. Then, by a gradual decrease in the magnitude of I1, accompanied by a gradual increase in the magnitude of I2, the voltage at the output terminal 30b and that at the output terminal 30c are equal to ($\frac{1}{2}$)Vs to provide the relationship of (I1=I2). With a further decrease of I1 accompanied by a further increase of I2, the condition wherein (I1<I2) is established. In other words, phase switching is performed gradually, and the generation of acoustic noises due to an abrupt current change is prevented at the time of the phase switching. In addition, an attenuation of the torque encountered with the phase switching can be cancelled with overlapped energization intervals at the time of phase switching at every 120° of an electrical cycle.

In FIG. 6H, even though the energization waveforms cross at points ¾ VS and ¼ VS, the design may be modified so that the crossing occurs at points higher than ¾ Vs and at points lower than ¼ VS. Furthermore, in the interval in which the energization waveform assumes a constant level of ½ VS, no current flows through one of the stator coils L1, L2, and L3 to achieve an improvement in motor efficiency as well as to prevent generation of an uneven torque.

For the above-described embodiment, the detection signals a, b, and c having an amplitude of (½)Vs are formed with respect to the voltage Vs applied to the stator coils L1, L2 and L3. However, the signals for the energization may be provided by amplifying detection signals having an amplitude of $(V1 = Vs/2n)$ (where n is an integer) when the amplitudes of the detection signals a, b, and c are represented by V1. It may also be noted that an actual circuit is constructed so that the inclination of the inclined portions of the energization waveform are altered so as to vary the hatched region shown in FIG. 6H within a range of electrical angles from about 2° to 30°.

e. Alternative embodiment

Figure 7:
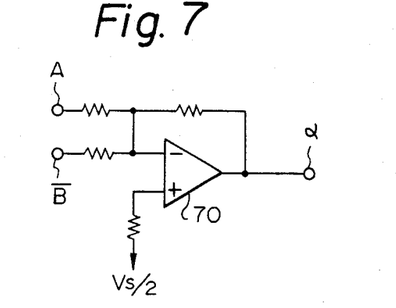
FIG. 7 is a circuit diagram of a portion of another embodiment of the circuit, according to the invention.
Figure 8:
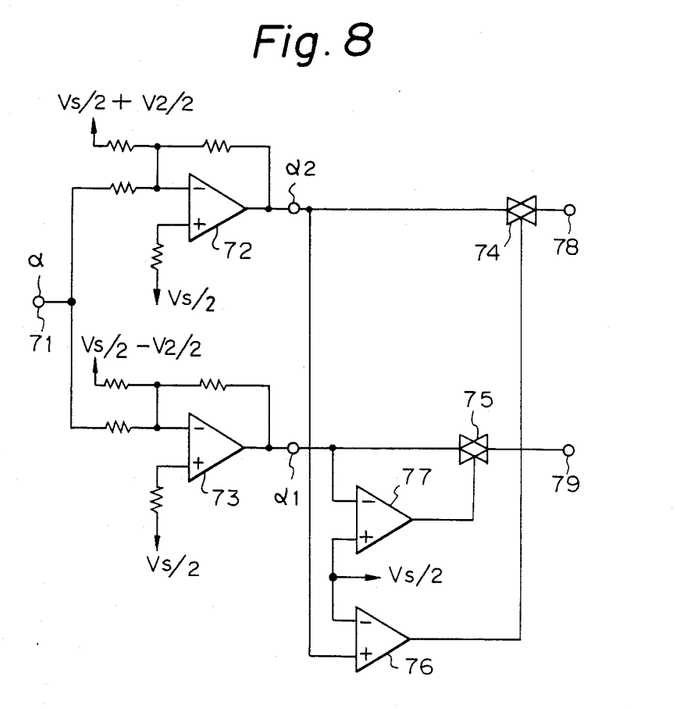
FIG. 8 is a circuit diagram of another embodiment of a portion of the circuit according to the invention.
Figure 9A:
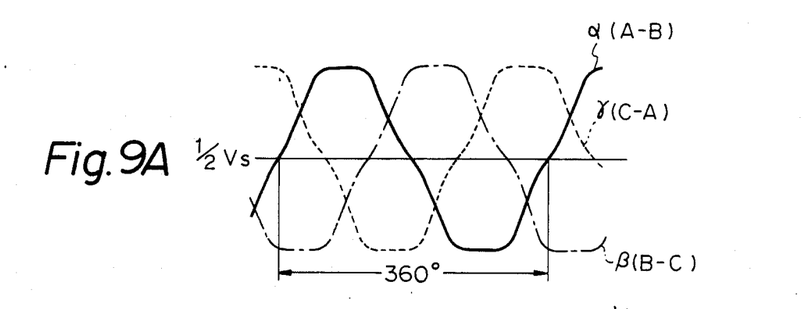

FIGS. 7 and 8 show another embodiment of the invention. This alternative embodiment develops the energization waveform using signals $\alpha$, $\beta$, and $\gamma$, shown in FIG. 9A, which are formed by mutually subtracting two detection signals from the detection signals A, B, and C, as shown in FIG. 2A, of the three Hall elements. Specifically, the signal $\alpha$ is formed by subtracting detection signal A from detection signal B (A−B); the signal $\beta$ is formed from (B−C); and the signal $\gamma$ is formed from (C−A). With this energization waveform using signals $\alpha$, $\beta$, and $\gamma$, a description of the development of an energization waveform for one phase will now be provided.

FIG. 7 shows an example of an addition circuit for developing the signal $\alpha$. The addition circuit includes an operational amplifier 70 to which the detection signal A and the detection signal $\overline{B}$, which is the inversion of the detection signal B, are supplied as input signals. The signal $\alpha$, which is equal to $(A+\overline{B}=A-B)$ is consequently formed with the addition circuit. The signal $\alpha$ has a middle level of (½)Vs similar to the signals $\beta$ and $\gamma$.

Figures 9B, 9C:
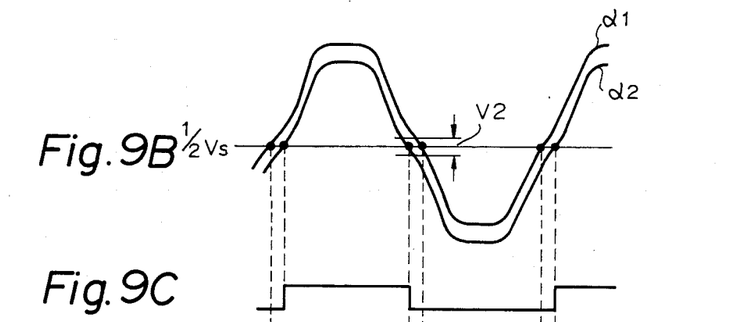

As shown in FIG. 8, the signal $\alpha$ is provided at an input terminal 71 to the inverting terminals of an operational amplifier 72 and an operational amplifier 73. The operational amplifier 72 produces a signal $\alpha 2$ which is level-shifted by a voltage value of $(+V2/2)$ and inverted. The operational amplifier 73 generates a signal $\alpha 1$, which is level-shifted by a value of $(-V2/2)$ and inverted. In FIG. 9B, the waveforms of the signals $\alpha 1$ and $\alpha 2$, which thus differ in magnitude by V2, are shown.

Figures 9D, 9E:
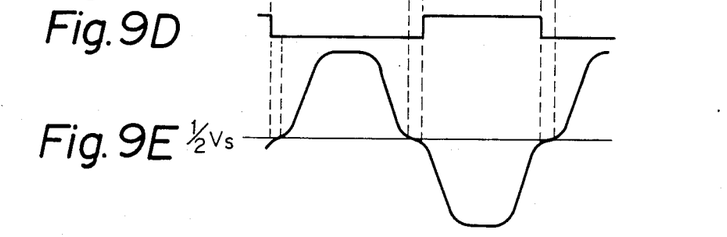

The signal $\alpha 2$ is provided to an analog switch 74 and a level comparator 76. The signal $\alpha 1$ is provided to an analog switch 75 and a level comparator 77. The level comparator 75 generates the switching pulse as shown in 9C, which assumes a high level for a period in which the level of the signal $\alpha 2$ is larger than the reference level of (½)Vs. On the other hand, the level comparator 77 produces a switching pulse, as shown in FIG. 9D, which assumes a high level for a period in which the level of the signal $\alpha 1$ is smaller than the reference level (½)Vs. Thus, the analog switch 74 turns on during a period in which the switching pulse from the level comparator 76 is maintained at a high level. The waveform of the signal $\alpha 2$ having a level greater than (½)Vs in an interval is provided to an output terminal 78. The analog switch 75 turns on during a period in which the switching pulse from the level comparator 77 is held at its high level, and the waveform of the signal $\alpha 1$, whose level is smaller than (½)Vs in an interval, is provided at an output terminal 79.

The stator coils are connected to the respective output terminals 78 and 79 through output circuits similarly to those used in the above-mentioned embodiment. Output voltages generated at the output terminals 78 and 79 by the output circuits are combined to provide a voltage having a waveform as shown in FIG. 9E. The energization waveform shown in FIG. 9E is similar to that shown in FIG. 6G. As a result, an abrupt current change at the time of phase switching is prevented and energizing levels are overlapped, while intervals in which no current flows through a stator coil are formed. Thus, in this alternative embodiment, an inclined angle and an energization angle of an energization waveform are set on the basis of a offset amount, a reference voltage for the level comparators, and the like, as previously described.

f. Modification

The invention is applicable not only to a BL motor of a three-phase bi-directional energization system, but also to a BL motor having a three-phase 120° and unidirectional energization system, a two-phase 90° energization system, and a four-phase 90° energization system.

FIG. 10 thus illustrates in a waveform diagram the development of energization waveforms in a case in which the invention is applied to a BL motor of a two-phase bi-directional, 90° energization system. FIG. 10A shows the detection signals A and B of two Hall elements. Assuming that the detection signals A and B have an amplitude of Vs, for example, in a manner similar to the above-mentioned original embodiment, the maximum values of both of the detection signals A and B are detected to form a signal as shown in FIG. 10B. The minimum values of both detection signals A and B are detected to provide a signal a shown in FIG. 10C.

Figure 10A:
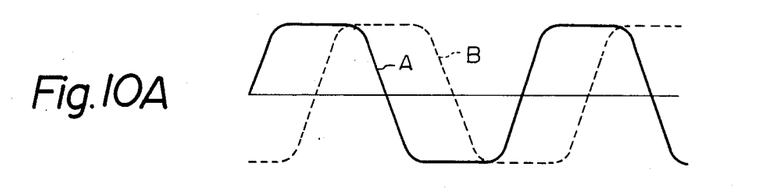
Figure 10B:
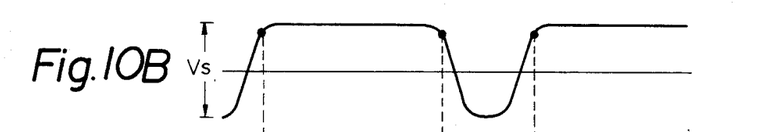
Figures 10C, 10D:
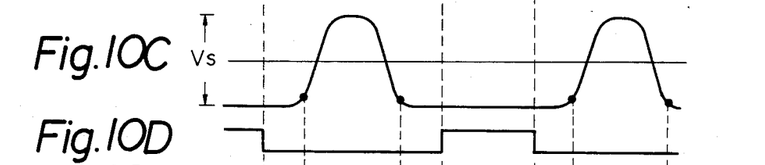
Figure 10E:
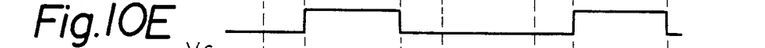
Figure 10F:
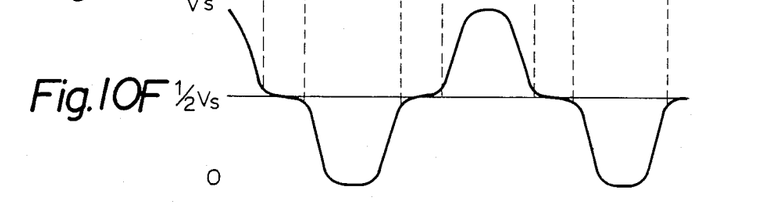
Figure 10G:
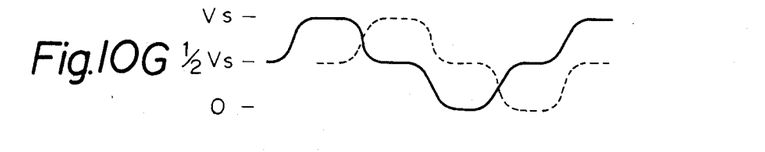

These switching pulses shown in FIGS. 10D and 10E are generated from the detection signals A and B of the Hall elements. Thus, the signal shown in FIG. 10B is inverted and level-shifted, and the waveform of the signal in a period is provided in which the switching pulse shown in FIG. 10E is maintained at high level. By combining two waveforms subjected to switching, an energization waveform as shown in FIG. 10F is obtained. Thus, as indicated in FIG. 10G, the energization waveforms denoted as a solid line and a broken line are provided to the stator coils. The energization waveforms thus shown in FIGS. 10F and 10G have a slow current change at the time of the phase switching and features similar to those in the previous described embodiments.

Thus, according to the invention, since a current change is slow at the time of phase switching, generation of acoustic noises in a switching system is prevented. Because the detection signals of the Hall elements having inclined waveforms are used in this invention as the inclined portions of the energization waveforms, no condenser is needed, thus, resulting in a low cost structure. In addition, even when the rotation number of a motor is small, such as at the time of starting, acoustic noise is nevertheless prevented. In addition, the invention has an advantage that the degradation of motor efficiency as appears in the linear drive system does not occur. Furthermore, the invention can be provided in such a system by merely replacing the drive circuit, without altering the mechanical structure of a brushless motor.

Thus, the present invention is not limited to the foregoing embodiments, since many modifications and variations are possible within the spirit and scope of the appended claims of the invention.

What is claimed is:

1. A brushless motor drive circuit comprising:
   a plurality of Hall elements for detecting magnetic flux changes of a rotating rotor magnet of a multi-phase brushless motor and providing an output signal representative thereof;
   a drive signal generating circuit connected to said Hall elements, including means for generating multi-phase drive signals to be supplied to stator windings of said multi-phase brushless motor, wherein each of said multi-phase drive signals has a pair of slanted edge portions and a relatively flat portion interposed between said pair of slanted edge portions, said drive signal generating circuit including means for directly forming said flat portion from said detected flux changes by selectively switching output signals from a pair of said Hall elements to define said flat portion; and
   wherein said drive signal generating circuit includes non-adding mixing circuits connected to said Hall elements, buffer amplifier circuits, clamping circuits, analog switching circuits, and output amplifiers respectively connected in series.

2. A brushless motor drive circuit as set forth in claim 1, wherein said drive signal generating circuit includes a signal clamping circuit which forms said flat portion of the multi-phase drive signal.

3. A brushless motor drive circuit as set forth in claim 2, wherein portions of each of said slanted edge portions of an adjacent two of said multi-phase drive signals forms an overlapping drive area.

4. A brushless motor drive circuit as set forth in claim 3, wherein each of said slanted edge portions of each of the multi-phase drive signals has an electric angle within the range of 2° el. to 30° el.

5. A brushless motor drive circuit as set forth in claim 1, wherien said drive signal generating circuit further includes switching pulse generating circuits for generating switching pulses to be supplied to said analog switching circuits based on said detected magnetic flux changes.

6. A brushless motor drive circuit comprising:
   a plurality of Hall elements for detecting magnetic flux changes of a rotating rotor magnet of a multi-phase brushless motor and providing an output signal representative thereof;
   a drive signal generating circuit connected to said Hall elements, including means for generating multi-phase drive signals to be supplied to stator windings of said multi-phase brushless motor, wherein each of said multi-phase drive signals has a pair of slanted edge portions and a relatively flat portion interposed between said pair of slanted edge portions, said drive signal generating circuit including means for directly forming said flat portion from said detected flux changes by selectively switching output signals from a pair of said Hall elements to define said flat portion; and
   wherein said drive signal generating circuit includes buffer amplifier circuits connected to said pair of said Hall elements, signal mixing circuits, analog switching circuits and output amplifiers connected in series.

7. A brushless motor drive circuit as set forth in claim 6, wherein said drive signal generating circuit includes means for generating switching signals to be supplied to said analog switching circuits based on outputs from a switching pulse generator.

8. A motor drive circuit comprising:
   means, including a plurality of Hall elements, for detecting a rotor position of a brushless motor and providing an energization signal indictive thereof;
   circuit means responsive to said energization signal of at least a pair of said Hall elements for shaping the waveform of said energization signal so that edge portions of the thus-shaped energization signals are not abrupt;
   wherein said waveform-shaping circuit means includes a plurality of buffer amplifying circuits connected to said Hall elements; clamping circuits; non-adding mixing circuits; analog switching circuits; and output amplifiers respectively connected in series, a pluality of such series connected circuits being respectively connected in parallel with the pair of said Hall elements; and
   means for applying said thus-shaped energization signals to stator coils of said brushless motor, thus preventing generation of acoustic noises.

9. The circuit as set forth in claim 8 wherein said waveform-shaping circuit means shapes said energization signals to include a pair of slanted edge portions and a relatively flat portion interposed between said pair of slanted edge portions.

10. The circuit as set forth in claim 9 wherein said waveform-shaping circuit means includes a signal clamping circuit to form the flat portion of said thus-shaped energization signal.

11. The circuit as set forth in claim 10 wherein said waveform-shaping circuit means forms an overlapping drive area between the slanted edge portions of adjacent pairs by said thus-shaped waveforms.

12. The circuit as set forth in claim 11 wherein said slanted edge portions subtend an electrical angle which lies within the range of 2° el. to 30° el.

13. The circuit as set forth in claim 8 wherein said waveform-shaping circuit means further includes switching pulse generating circuits for generating switching pulses supplied to the analog switching circuits based upon detected magnetic flux changes by said Hall elements.

14. A brushless motor drive circuit comprising:
   a plurality of Hall elements for detecting magnetic flux changes of a rotor magnet of a multi-phase brushless motor and providing an output signal representative thereof;
   multi-phase stator windings for said brushless motor, said multi-phase stator windings having a common connection; and
   means for generating multi-phase drive signals to be supplied to said stator windings of said brushless motor, said drive signal generating means providing to each of said stator windings a drive signal which has a pair of electrically spaced slanted edge portions and a relatively flat portion interposed between said pair of slanted edge portions, said drive signal generating means including, for each of said multi-phase stator windings, circuit means for mixing output signals from a pair of adjacent Hall elements; means for selectively switching the respective output signals to define said relatively flat portion of said drive signals so that when said drive signals are applied to said stator winding, the magnitude of current in one stator winding is gradually increasing while the magnitude of current in another stator winding is gradually decreasing so that phase switching is performed gradually;

said drive signal generating means further including buffer amplifier circuits, clamping circuits, analog switching circuits, and output amplifiers respectively connected in series with each of said piar of adjacent Hall elements.

* * * * *